P. H. WATSON.
Wheat Fan.

No. 5,616. Patented June 6, 1848.

UNITED STATES PATENT OFFICE.

PETER H. WATSON, OF ROCKFORD, ILLINOIS, ASSIGNOR TO WM. WATSON.

WHEAT-PAN.

Specification of Letters Patent No. 5,616, dated June 6, 1848.

*To all whom it may concern:*

Be it known that I, PETER H. WATSON, of Rockfield, in the county of Winnebago and State of Illinois, have invented certain new and useful Improvements in Winnowing-Machines, of which the following is a full and exact description, reference being had to the annexed drawings of the same, making part of this specification, in which—

Figure 4:
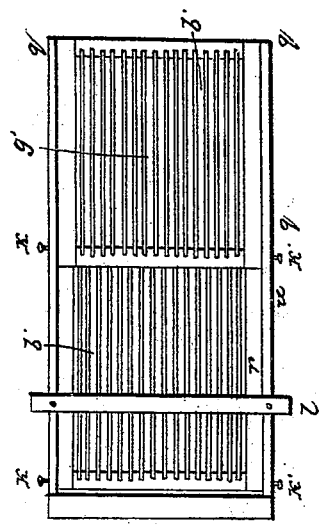
Figure 2:
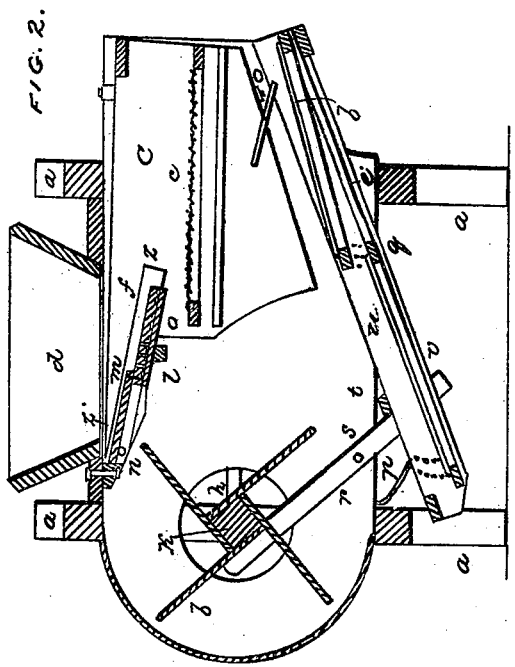
Figure 3:
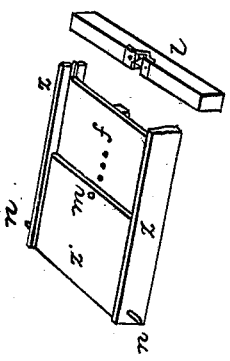
Figure 1:
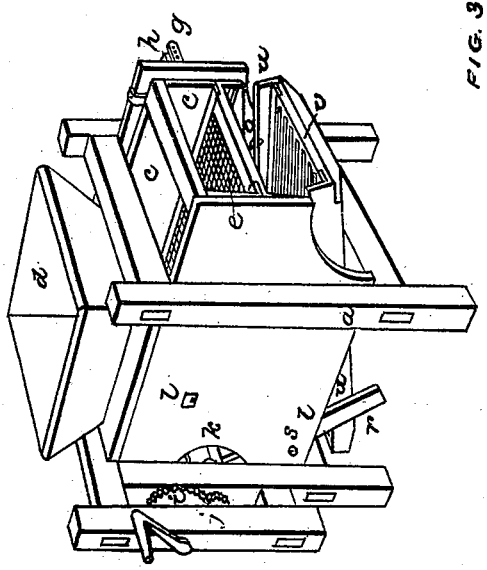

Figure 1 is a perspective view of the machine ready for operation, Fig. 2 is a longitudinal vertical section through the middle of the same, Fig. 3 is a perspective view of the inclined feed board, with its frame, and of the angular rib attached to its under side, and also of the fixed cross-bar with its angular grooves, Fig. 4 is a plan of the screens.

The same letters indicate the same parts in all the figures.

The frame $a$ fan $b$ shoe $c$ hopper $d$ sieve $e$ bell-crank and rod $g$, $h$ for shaking the shoe, the cogged gearing $i$ $j$ and crank shaft $k$ are constructed and arranged as represented in the drawings, or in any other convenient and suitable way.

The nature of the improvement I have made consists in a certain new and useful combination of parts for the purpose of giving to the inclined feed board $f$ a compound vertical and horizontal vibratory motion to distribute the grain and chaff more evenly upon the sieve and feed it with greater uniformity than is done by any of the devices heretofore used for that purpose. Also in a new mode of constructing the screens $v$ $v$ and combining them with the frame $u$ $u$ so as to admit of their adjustment at such an angle as will best adapt it to separate impurities from the grain being operated upon.

The device for producing the vertical movement of the inclined feed board, consists of a horizontal transverse bar $l$ secured to the side of the mill and having an angular groove $x$ made transversely across it in which the rib $o'$ of crresponding form attached to the under side of the feed board drops when caused to traverse the bar $l$ by the vibration of the shoe.

The feed board $f$ slides in grooves formed on the inner side of the hinged frame $z$ $z$ $z'$ Figs. 2 and 3 so that it may be adjusted to discharge the grain and chaff upon any required point of the sieve $e$ and when adjusted is held in position by a pin or screw $m$ which fastens it to the part $z'$ of the frame.

The frame and feed board are secured to the inner end of the shoe by the pivots $n$ $n$, the outer end of the feed board and the frame being free to rise and fall as the rib $o$ drops into or rises out of the groove $x$.

The shoe $c$ is vibrated in the usual manner by means of connecting rods and bell cranks operated from the fan shaft, the feed board being hinged to the shoe is vibrated with it, traversing horizontally the bar $l$ and rising and falling as it crosses the groove $x$. Thus a compound vertical and lateral motion is produced which is found to discharge the grain and chaff from the hopper with greater uniformity, and feed the screen more evenly than has been done by other methods.

The screen is composed of rectangular frames of parallel rods or wires $v$ $v$; the wires being so large, that they do not require to be stayed or braced by being interlaced transversely with small wires at short intervals, as in screens of the ordinary construction, these stout wires are placed at such a distance apart that the small seeds of weeds, shrunken grain, and other impurities may drop through the spaces between them, while the full sound grain will roll down to the front of the mill to be garnered by the attendant.

The frames of wires $v$ $v$ are placed in a frame $u$, being secured therein at their upper end by projecting pins or pivots $q$ $q$ Fig. 4 which are inserted in grooves formed in the inner sides of the frame $u$ and on which pivots the screens can be turned the lower ends of the screens are fastened to the side of the frame $u$ in any required position by the set screws $k'$ by straps, hooks, or otherwise. This arrangement admits of the inclination of the screens being increased and diminished and of their being slidden backward and forward in the frame $u$ as may become necessary.

I usually place the upper division of the screen at a less angle of inclination than the lower division of the same, by raising its lower end, because its vibrating motion being much more violent if it were placed at the same inclination the grain would pass over it too rapidly to get thoroughly screened, besides the raising of the lower end of the upper division of the screen forms an opening through which the blast from the fan passes carrying with it any chaff or other light impurities not blown out from the grain during its fall from the sieve e to the screen—the combined results of this process is as thorough a cleaning of the grain as if it had been twice operated upon by a common mill.

The swing frame u with its screens, is vibrated laterally by the motion of the shoe, with which it is connected by straps, links, or hooks o o, but it is also vibrated lengthwise, by means of two oblique levers r r turning upon fulcra s s which project from the sides of the fan, the upper end of these levers are held against the under side of the shaft k by the weight of the screen which rests against their lower ends, and when the shaft revolves its corners acting like tappets strike against the levers causing them to vibrate, which of course vibrates the screen which rests against them. The before described improvements are as applicable to mills with oblique fans as to those with radial fans.

What I claim as my invention and desire to secure by Letters Patent is—

The combination of the angular rib and groove, with the feed board substantially in the manner and for the purpose herein set forth.

2. I likewise claim the combination of the screens v v with the swing frame u so as to adjust or graduate their inclination in such a manner that their slope may be inversely proportional to the amount of shake or vibratory motion which they severally receive, in the manner herein described.

P. H. WATSON.

Witnesses:
JOHN PALMER,
THOMAS JOHNS.